(12) United States Patent
Minamizawa

(10) Patent No.: US 8,040,538 B2
(45) Date of Patent: Oct. 18, 2011

(54) INFORMATION PROCESSING APPARATUS THAT RECEIVES BIOMETRIC DATA FOR CONTROLLING ACCESS

(75) Inventor: Fumihiro Minamizawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1206 days.

(21) Appl. No.: 11/693,135

(22) Filed: Mar. 29, 2007

(65) Prior Publication Data

US 2007/0245156 A1    Oct. 18, 2007

(30) Foreign Application Priority Data

Mar. 31, 2006  (JP) ................................. 2006-098058

(51) Int. Cl.
  *G06F 15/00*  (2006.01)
  *G06F 3/12*  (2006.01)
  *G06K 1/00*  (2006.01)
(52) U.S. Cl. ..................... 358/1.13; 358/1.15
(58) Field of Classification Search ............... 358/1.1, 358/1.15, 1.13, 1.14, 1.6
  See application file for complete search history.

(56) References Cited

U.S. PATENT DOCUMENTS

| 2005/0210271 | A1* | 9/2005 | Chou et al. | 713/186 |
| 2010/0228373 | A1* | 9/2010 | Lucas et al. | 700/108 |
| 2010/0305765 | A1* | 12/2010 | Sutardja | 700/284 |

FOREIGN PATENT DOCUMENTS

| JP | 2001125734 | 5/2001 |
| JP | 2001274897 | 10/2001 |
| JP | 2002044727 | 2/2002 |
| JP | 2002-281277 | 9/2002 |
| JP | 2002271541 | 9/2002 |
| JP | 2003-233279 | 8/2003 |
| JP | 2003-256841 | 9/2003 |
| JP | 2005006259 | 1/2005 |
| JP | 2006-011547 | 1/2006 |
| JP | 2006004049 | 1/2006 |

OTHER PUBLICATIONS

Office Action received for counterpart Japanese Application 2006-098058 mailed Jun. 1, 2010.
Notification of Reason for Refusal in corresponding Japanese Patent Application 2006-098058 mailed Aug. 24, 2010.

* cited by examiner

*Primary Examiner* — Douglas Tran
(74) *Attorney, Agent, or Firm* — Banner & Witcoff, Ltd

(57) ABSTRACT

An information processing apparatus includes: a first input unit that allows a user to input a biometric data of the user; a storage that stores a setting data corresponding to the biometric data; a setting unit that sets the setting data corresponding to the biometric data as a setting condition when the biometric data is inputted by the first input unit; a processing unit that performs a processing in accordance with the setting condition; a transmission unit that transmits the biometric data to an external device.

15 Claims, 12 Drawing Sheets

FIG. 2

USER INFORMATION STORING TABLE

| USER | FINGERPRINT COLLATION DATA | USER ID | PASSWORD | FAX | COPY | DIGITAL CAMERA PRINT | PC SCANNER | PC FAX | PC PRINT | FINGERPRINT TRANSMISSION |
|---|---|---|---|---|---|---|---|---|---|---|
| A | XXXXX | userA | ******** | PERMISSION | PERMISSION | PERMISSION | PERMISSION | PERMISSION | PERMISSION | PERMISSION |
| B | XXXXX | userB | ******** | NON-PERMISSION | PERMISSION | PERMISSION | NON-PERMISSION | NON-PERMISSION | NON-PERMISSION | NON-PERMISSION |
| C | XXXXX | userC | ******** | PERMISSION | PERMISSION | PERMISSION | PERMISSION | PERMISSION | PERMISSION | PERMISSION |
| ... | ... | ... | ... | ... | ... | ... | ... | ... | ... | ... |

FIG. 10

USER INFORMATION STORING TABLE

| USER | FINGERPRINT COLLATION DATA | USER ID | PASSWORD | FAX | COPY | DIGITAL CAMERA PRINT | PC SCANNER | PC FAX | PC PRINT | PC NAME | IP ADDRESS |
|---|---|---|---|---|---|---|---|---|---|---|---|
| A | XXXXX | userA | ********* | PERMISSION | PERMISSION | PERMISSION | PERMISSION | PERMISSION | PERMISSION | APC | ×××× |
| B | XXXXX | userB | ********* | NON-PERMISSION | PERMISSION | PERMISSION | NON-PERMISSION | NON-PERMISSION | NON-PERMISSION | BPC | ×××× |
| C | XXXXX | userC | ********* | PERMISSION | PERMISSION | PERMISSION | PERMISSION | PERMISSION | PERMISSION | CPC | ×××× |
| ... | ... | ... | ... | ... | ... | ... | ... | ... | ... | ... | ... |

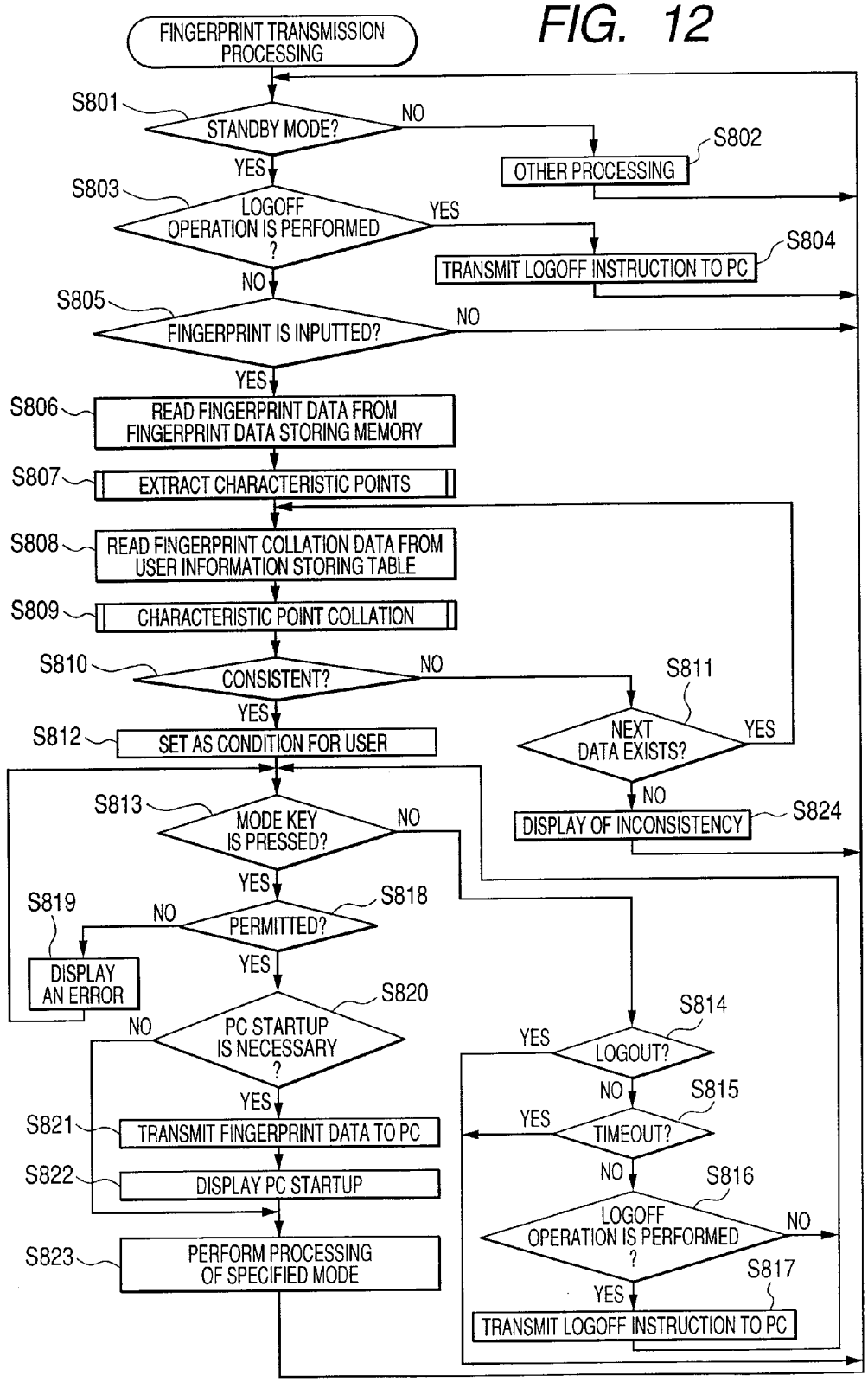

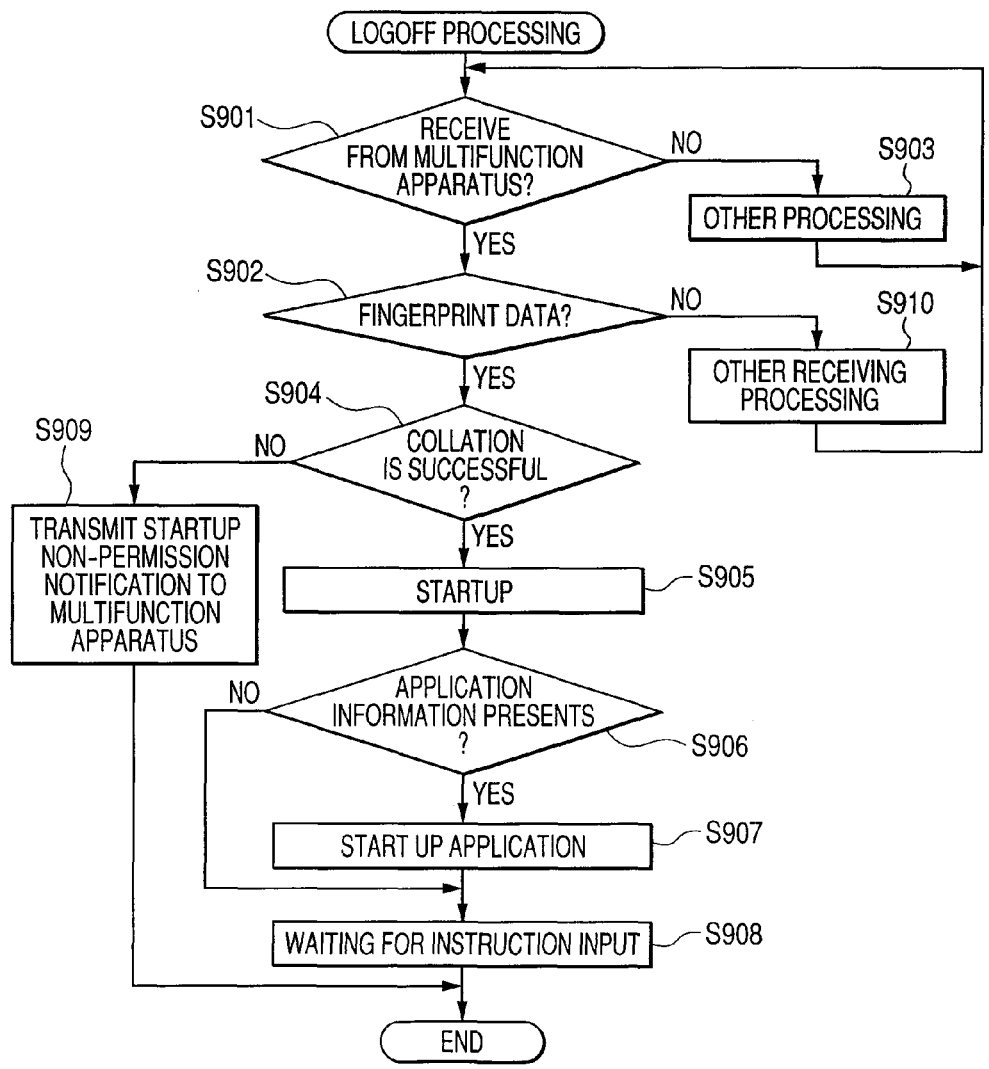

INFORMATION PROCESSING APPARATUS THAT RECEIVES BIOMETRIC DATA FOR CONTROLLING ACCESS

CROSS-REFERENCE TO RELATED APPLICATION

This application claims priority from Japanese Patent Application No. 2006-098058, filed on Mar. 31, 2006, the entire subject matter of which is incorporated herein by reference.

TECHNICAL FIELD

The present invention relates to an information processing apparatus to which a biometric data is inputted.

BACKGROUND

In recent years, with increasing interest in security, it has been proposed to provide a biometrics function in various apparatuses.

For example, JP-A-2005-6259 discloses a multifunction apparatus including a fingerprint sensor arranged in a telephone directory key, a start key, etc., of an operation panel. The multifunction apparatus identifies a user on the basis of the inputted fingerprint and perform a processing in accordance with a setting condition dedicated for the user.

Nevertheless, in the configuration described in the JP-A-2005-6259, the fingerprint read by the multifunction apparatus is merely used within the multifunction apparatus. That is, its utilization in another apparatus is not taken into consideration at all.

According to an aspect of the present invention, there is provided a configuration that in an information processing apparatus to which a biometric data is inputted, the inputted biometric data is configure to be utilized not only in the information processing apparatus but also in another application.

SUMMARY

An aspect of the present invention provides an information processing apparatus includes; a first input unit that allows a user to input a biometric data of the user; a storage that stores a setting data corresponding to the biometric data; a setting unit that sets the setting data corresponding to the biometric data as a setting condition when the biometric data is inputted by the first input unit; a processing unit that performs a processing in accordance with the setting condition; a transmission unit that transmits the biometric data to an external device.

BRIEF DESCRIPTION OF THE DRAWINGS

In the accompanying drawings:

FIG. 2 is an explanatory diagram of a user information storing table of a first aspect;

FIG. 10 is an explanatory diagram of a user information storing table of a second aspect;

FIG. 12 is a flowchart of fingerprint transmission processing performed by a multifunction apparatus of a third aspect;

FIG. 13 is an explanatory diagram of a user information storing table of a fourth aspect; and FIG. 14 is a flowchart of logoff processing performed by a personal computer of a fourth aspect.

DETAILED DESCRIPTION

Aspects according to the present invention are described below with reference to the drawings.

First Aspect

Figure 1:
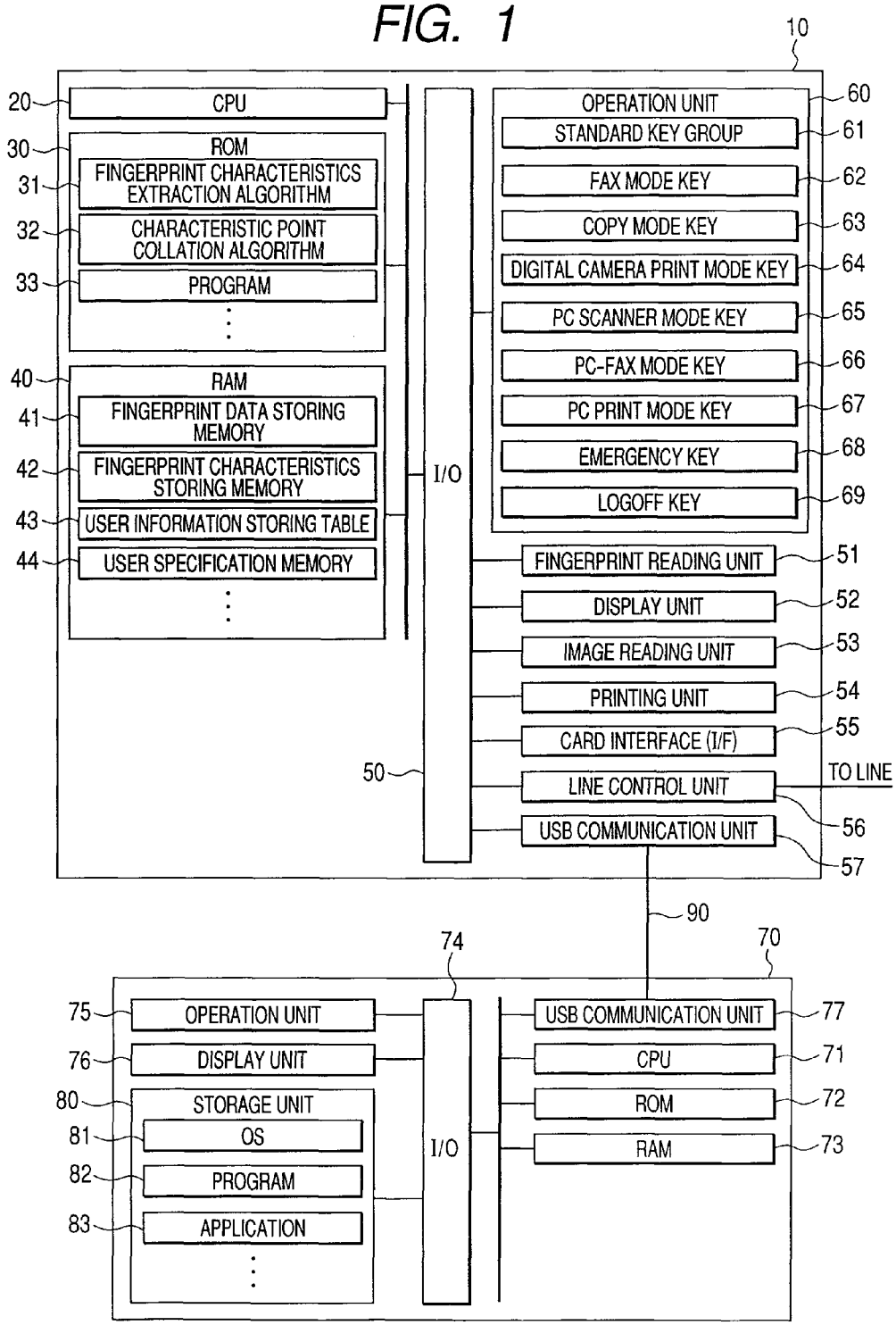
FIG. 1 is a block diagram showing a schematic configuration of a communication system of a first aspect.

FIG. 1 is a block diagram showing a schematic configuration of a communication system of a first aspect.

As shown in FIG. 1, this communication system includes a multifunction apparatus 10 and a personal computer 70 that communicate with each other via a USB cable 90.

The multifunction apparatus 10 having a FAX function, a copy function, a digital camera print function, a PC scanner function, a PC-FAX function, and a PC print function.

The FAX function indicates: a function of reading an image of a document, and transmitting image data representing the image via a public switched telephone network (PSTN); and a function of printing an image represented by an image data received via the public switched telephone network, on a recording medium such as a printing sheet.

The copy function indicates a function of reading an image of a document and printing the image on a recording medium.

The digital camera print function indicates a function of reading and printing image data directly from a memory card serving as a portable storage medium that stores an image data representing an image taken by a digital still camera, etc., not via an information processing apparatus such as the personal computer 70.

The PC scanner function indicates a function of reading an image of a document and transmitting image data representing the image to the personal computer 70.

The PC-FAX function indicates: a function of transmitting, via the public switched telephone network, image data received from the personal computer 70; and a function of transmitting, to the personal computer 70, image data received via the public switched telephone network.

The PC print function indicates a function of printing on a recording medium an image represented by image data received from the personal computer 70.

As described above, the FAX function, the copy function, and the digital camera print function are functions that can be performed by the multifunction apparatus 10 alone (independently of the personal computer 70). On the other hand, the PC scanner function, the PC-FAX function, and the PC print function are functions performed by the multifunction apparatus 10 in cooperation with the personal computer 70.

Further, the multifunction apparatus 10 also has a function (fingerprint transmitting function) of reading a fingerprint of a user of the multifunction apparatus 10 and transmitting the data of the fingerprint to the personal computer 70.

In order to realize these functions, the multifunction apparatus 10 includes a CPU 20, a ROM 30, a RAM 40, an input/output interface (I/O) 50, an operation unit 60, a fingerprint reading unit 51, a display unit 52, an image reading unit 53, a printing unit 54, a card interface (I/F) 55, a line control unit 56, and a USB communication unit 57.

The fingerprint reading unit 51 is a device for reading a fingerprint. Here, the method for reading a fingerprint may be a well-known method like: a method for determining the depression and protrusion of a fingerprint on the basis of the amount of charge detected by a semiconductor sensor and then converting this into an image; and a method for determining the depression and protrusion of a fingerprint on the basis of the state of reflection of light projected on the fingerprint and then converting this into an image.

The operation unit 60 allows a user to input an instruction by a key operation. As keys that is pressed by a user, the operation unit 60 has: a standard key group 61 including a cursor key, numerical keys, a start key, a stop key, etc.; mode keys 62 to 67 used for shifting the operation mode in which each function described above is performed; an emergency key 68; and a logoff key 69. Here, specifically, the mode keys 62 to 67 indicate a FAX mode key 62, a copy mode key 63, a digital camera print mode key 64, a PC scanner mode key 65, a PCFAX mode key 66, and a PC print mode key 67.

The display unit 52 displays various kinds of information on a display screen (a liquid crystal display in the present aspect).

The image reading unit (scanner) 53 reads an image of a document by an image sensor such as a Charge Coupled Device (CCD), and generates image data representing the image.

The printing unit (printer) 54 prints on a recording medium an image represented by an image data.

The card interface 55 has a card slot into which a memory card can be directly inserted, and reads image data stored in the memory card from the memory card in a state inserted into the card slot.

The line control unit 56 performs communication processing via the public switched telephone network.

The USB communication unit 57 performs communication processing via the USB cable 90.

The ROM 30 stores: a fingerprint characteristics extraction algorithm 31 which is an algorithm for extracting characteristic points from a fingerprint read by the fingerprint reading unit 51; and a characteristic point collation algorithm 32 which is an algorithm for comparing the characteristic points of the fingerprint and thereby the fingerprint is collated. Here, the fingerprint characteristics extraction algorithm 31 may include, for example, a procedure of extracting, as characteristic points, locations showing the characteristics of the pattern of a fingerprint, like a center point which is the center of a fingerprint pattern, a branch point which is a branch of the protrusion pattern of a fingerprint, an endpoint which is an ending point of the protrusion pattern of a fingerprint, and a triangle site which is an assembly from three directions. Further, the characteristic point collation algorithm 32 may include, for example, a procedure of comparing the data of characteristic points between the fingerprint data of collation target and the registered fingerprint data with respect to the kind of the characteristic point, the orientation of the characteristic point, the coordinates from the center point of the characteristic point, etc., and thereby determines that both are consistent when the result exceeds a predetermined determination level. Further, the ROM 30 stores a program 33 for causing the CPU 20 to perform various processing (FIGS. 3 to 6) described later.

The RAM 40 is used as a temporary working area for the CPU 20. Further, in the RAM 40, storage areas are allocated for: a fingerprint data storing memory 41 for storing fingerprint data representing a fingerprint (an image data representing the read fingerprint itself) when the fingerprint is read by the fingerprint reading unit 51; and a fingerprint characteristics storing memory 42 for storing fingerprint characteristics data that represents the fingerprint in terms of characteristic points. Further, in the RAM 40, a storage area is allocated for a user information storing table 43 (FIG. 2) for storing individual user information for a plurality of users. In addition, in the RAM 40, a storage area is allocated for a user specification memory 44 for storing information indicating the current setting condition of the multifunction apparatus 10.

On the other hand, the personal computer 70 has a well-known hardware configuration, and includes a CPU 71, a ROM 72, a RAM 73, an input/output interface (I/O) 74, an operation unit 75, a display unit 76, a storage unit 80, and a USB communication unit 77.

The operation unit 75 has a keyboard and a pointing device (such as a mouse) operable by a user, and allows a user to input an instruction by such devices.

The display unit 76 displays various kinds of information on a display screen (a liquid crystal display in the present aspect).

The storage unit (a hard disk in the present aspect) 80 stores various kinds of information. Specifically, to the storage unit 80, an operating system (OS) 81 and a program 82 for causing the CPU 71 to perform various processing (FIGS. 7 and 8) described later are installed. Further, to the storage unit 80, a plurality of applications (word-processing software, an image browser, etc.) 83 for performing processing in cooperation with the various functions included in the multifunction apparatus 10 are installed.

As the operating system 81, a well-known Windows® series using a graphical user interface (GUI) is employed. Then, this operating system 81 individually imparts the right of use of the personal computer 70 on each user. Specifically, when an authorized user ID and a password are inputted, the state shifts from a logoff state (a state that the personal computer 70 cannot be used (a standby state)) into a logon state (a state that the personal computer 70 can be used (an active state)). The logoff state described here includes, for example, a state that a screen saver is started up so that the state does not restore unless a password, etc., is inputted.

In particular, in the personal computer 70 of the present communication system, setting is performed so that the input of a fingerprint is requested in addition to the user ID and the password when the state should shift from a logoff state into a logon state. That is, as the information of an authorized user, the personal computer 70 stores a data of the fingerprint in addition to the user ID and the password, and performs user authentication on the basis of these. Thus, in the present communication system, the personal computer 70 shifts from a logoff state into a logon state only when the fingerprint is received from the multifunction apparatus 10. Here, the method for storing the data of the fingerprint into the personal computer 70 may be, for example: a method that the information of the fingerprint is transmitted from the multifunction apparatus 10 so that registration is performed; and a method that a fingerprint reader is temporarily coupled to the personal computer 70 so that the data of the fingerprint is inputted.

In the communication system of the first aspect having the above-described configuration, the multifunction apparatus 10 is configured so as to perform processing in accordance with a setting condition. Specifically, as the setting condition, whether the execution of each of the FAX function, the copy function, the digital camera print function, the PC scanner function, the PC-FAX function, and the PC print function is permitted is set up. Functions set up as non-permission are not executed. Then, in the multifunction apparatus 10, a setting data to be set up as the setting condition is registered for each user in a manner corresponding to the fingerprint of the user. Then, when a data of a fingerprint is inputted, a setting data that is stored while being corresponding to the inputted data of the fingerprint is set up as the setting condition. Further, the multifunction apparatus 10 also performs the processing of transmitting the inputted data of the fingerprint to the personal computer 70.

Detailed contents are described below for the processing performed by the multifunction apparatus 10 and the personal computer 70 in the present communication system.

Figure 3:
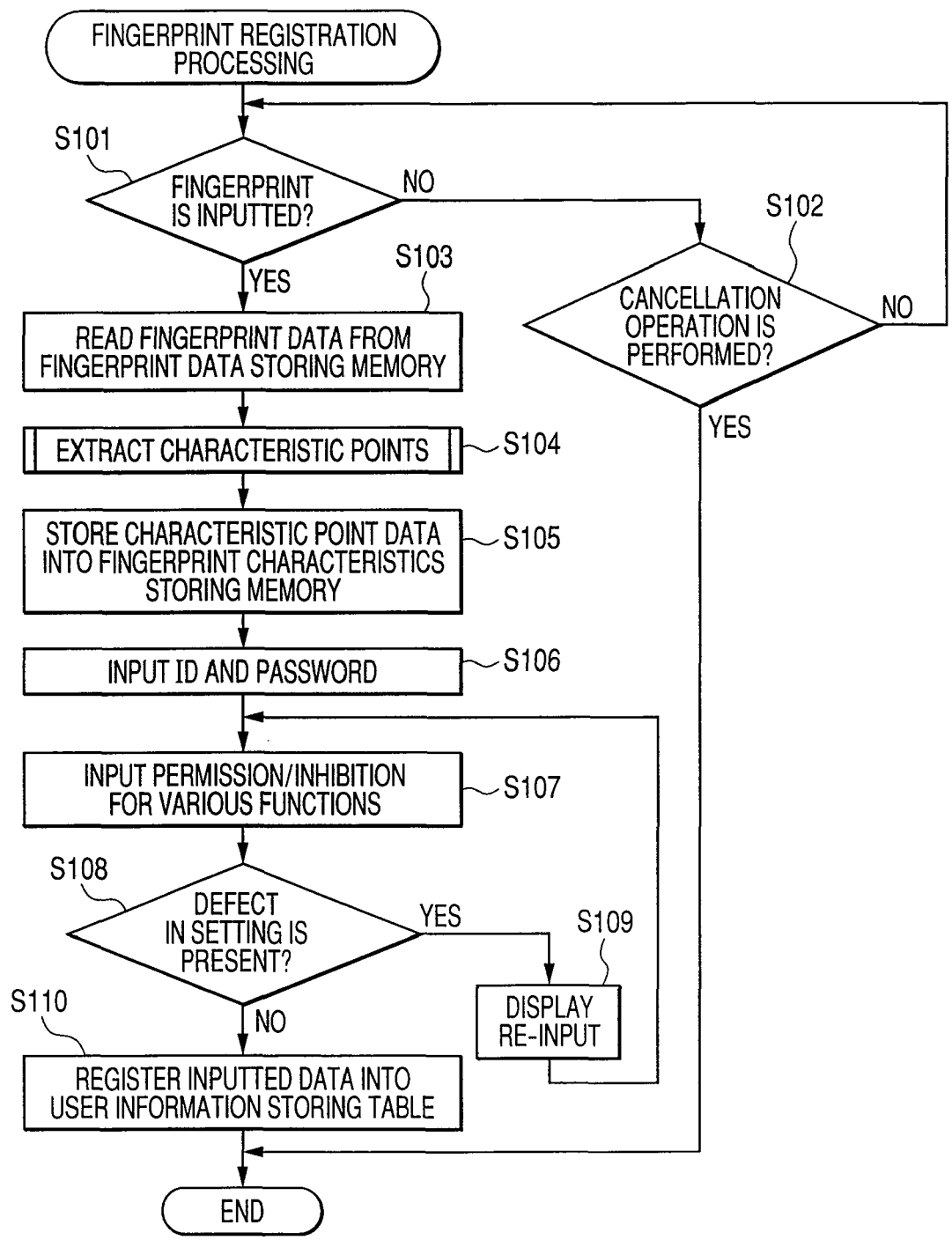
FIG. 3 is a flowchart of fingerprint registration processing performed by a multifunction apparatus of a first aspect.

First, fingerprint registration processing performed by the CPU 20 of the multifunction apparatus 10 is described with reference to the flowchart of FIG. 3. Here, the fingerprint registration processing is started when a predetermined fingerprint registration start operation is performed in the operation unit 60 of the multifunction apparatus 10 (a password, a fingerprint, etc., are inputted by a manager of the present communication system, in the present aspect). The fingerprint registration processing starts in an administrator mode.

When the fingerprint registration processing starts, first, at S101, a fingerprint is read by the fingerprint reading unit 51, so that it is determined whether a fingerprint has been inputted. Here, when a fingerprint is read by the fingerprint reading unit 51, fingerprint data representing the fingerprint is stored into the fingerprint data storing memory 41 of the RAM 40.

Then, at S101, when it is determined that a fingerprint has not been inputted, the procedure shifts to S102. Then, it is determined whether predetermined cancellation operation for canceling the fingerprint registration has been performed in the operation unit 60. Then, when it is determined that cancellation operation is not performed, the procedure returns to S101. That is, fingerprint input is waiting until cancellation operation is performed.

On the other hand, at S102, when it is determined that cancellation operation has been performed, the present fingerprint registration processing is directly terminated.

On the other hand, at S101, when it is determined that a fingerprint has been inputted, the procedure shifts to S103. Then, a processing is performed for reading the fingerprint data (fingerprint data that represents the fingerprint read by the fingerprint reading unit 51) stored in the fingerprint data storing memory 41.

Then, at S104, in accordance with the fingerprint characteristics extraction algorithm 31 stored in the ROM 30, a characteristic point extraction processing is performed for extracting characteristic points from the fingerprint represented by the fingerprint data read at S103.

Then, at S105, a fingerprint characteristics data representing the characteristic points extracted at S104 is stored into the fingerprint characteristics storing memory 42 of the RAM 40.

Then, at S106, as user information corresponding to the inputted fingerprint, a user ID and a password used for logging on the personal computer 70 are inputted. Specifically, a message for requesting information to be inputted is displayed on the display unit 52, so that the user is requested to perform input by the standard key group 61 of the operation unit 60.

Then, at S107, as user information corresponding to the inputted fingerprint data, information concerning whether or not each function included in the multifunction apparatus 10 is to be permitted is input. Specifically, selection of any one of permission/non-permission (prohibition) for each of the FAX function, the copy function, the digital camera print function, the PC scanner function, the PC-FAX function, the PC print function, and the fingerprint transmitting function is inputted by the standard key group 61 of the operation unit 60.

Then, at S108, it is determined whether the contents of the setting inputted at S107 have a defect. Specifically, when non-permission is selected for the fingerprint transmitting function regardless that permission is selected for a part or all of the functions (the PC scanner function, the PC-FAX function, and the PC print function) to be performed in cooperation with the personal computer 70, it is determined that defect is present.

Then, at S108, when it is determined that the defect is present, the procedure shifts to S109. Then, a message that the inputted contents of the information for the functions are not appropriate and hence invalid is displayed on the display unit 52. Then, the procedure returns to S107.

On the other hand, at S108, when it is determined that the defect is not present, the procedure shifts to S110. Then, various kinds of inputted information are registered (stored) into the user information storing table 43 (FIG. 2) of the RAM 40 while being corresponding to the user name. Specifically, first, the fingerprint characteristics data stored into the fingerprint characteristics storing memory 42 at S105 is registered as a fingerprint collation data. Then, the user ID and the password inputted at S106 are registered. Further, the information concerning the permission/non-permission for each function inputted at S107 is registered. After that, the present fingerprint registration processing is terminated.

Figure 4:
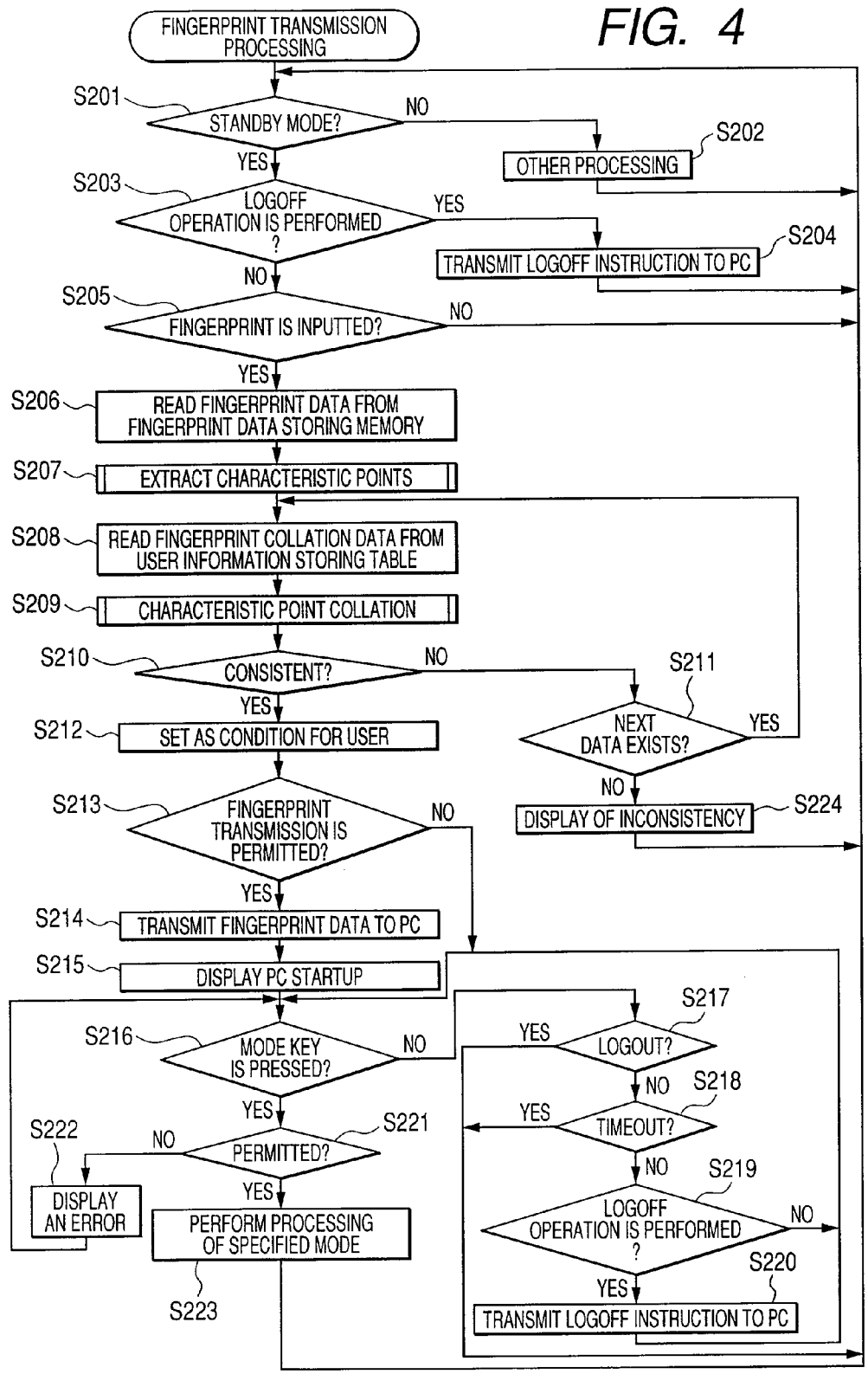
FIG. 4 is a flowchart of fingerprint transmission processing performed by a multifunction apparatus of a first aspect.

Next, fingerprint transmission processing performed by the CPU 20 of the multifunction apparatus 10 is described with reference to the flowchart of FIG. 4. Here, the fingerprint transmission processing starts when the power of the multifunction apparatus 10 is turned on.

When the fingerprint transmission processing starts, first, at S201, it is determined whether the multifunction apparatus 10 is in a standby state. Here, the standby state indicates a state that other processing (e.g., the processing of performing each function described above) is not performed.

Then, at S201, when it is determined that the multifunction apparatus 10 is not in the standby state, the procedure shifts to S202. Then, on completion of other processing under execution, the procedure returns to S201.

On the other hand, at S201, when it is determined that it is in standby state, the procedure shifts to S203. Then, it is determined whether logoff operation for causing the personal computer 70 to be logged off has been performed in the operation unit 60. Specifically, it is determined whether the logoff key 69 of the operation unit 60 has been pressed.

Then, at S203, when it is determined that logoff operation has been performed, the procedure shifts to S204. Then, a logoff instruction for logging off the personal computer 70 is transmitted to the personal computer 70. After that, the procedure returns to S201. As such, as described later, the personal computer 70 shifts from a logon state into a logoff state (S601, S602).

As such, the operation of the logoff key 69 for transmitting a logoff instruction is acceptable even before the fingerprint input is performed. Thus, even an unspecified person not allowed to use the multifunction apparatus 10, in particular, can cause the personal computer 70 to shift to a logoff state.

On the other hand, at S203, when it is determined that logoff operation is not performed, the procedure shifts to S205. Then, a fingerprint is read by the fingerprint reading unit 51, so that it is determined whether a fingerprint has been inputted.

Then, at S205, when it is determined that a fingerprint is not inputted, the procedure returns to S201.

On the other hand, at S205, when it is determined that a fingerprint has been inputted, the procedure shifts to S206. Then, processing is performed for extracting the fingerprint data (fingerprint data that represents the fingerprint read by the fingerprint reading unit 51) stored in the fingerprint data storing memory 41.

Then, at S207, in accordance with the fingerprint characteristics extraction algorithm 31 stored in the ROM 30, characteristic point extraction processing is performed for extracting characteristic points from the fingerprint represented by the fingerprint data read at S206.

Then, at S208, processing is performed for reading a fingerprint collation data (one of the plurality of finger print collation data, when fingerprint collation data is stored for a plurality of users) from the user information storing table 43.

Then, at S209, in accordance with the characteristic point collation algorithm 32 stored in the ROM 30, characteristic point collation processing is performed for collating the characteristic points of the fingerprint extracted at S207 with the fingerprint collation data read at S208.

Then, at S210, it is determined whether the characteristic points are consistent with each other at the characteristic point collation processing at S209.

Then, at S210, when it is determined that the characteristic points are not consistent with each other, the procedure shifts to S211. Then, it is determined whether the next data (not-yet-collated data) exists in the user information storing table 43.

Then, at S211, when it is determined that the next data exists, the procedure returns to S208. Then, the above-described processing is performed.

On the other hand, at S211, when it is determined that the next data does not exist (that is, when the user authentication is unsuccessful), the procedure shifts to S224. Then, a message that the user authentication is unsuccessful is displayed on the display unit 52. Then, the procedure returns to S201. Here, a predetermined buzzer sound may be outputted together with the message.

On the other hand, at S210, when it is determined that the characteristic points are consistent with each other (that is, when the user authentication is successful), the procedure shifts to S212. Then, among the information stored in the user information storing table 43, information corresponding to the authenticated user is set up as the setting condition of the multifunction apparatus 10. Specifically, information that permits to identifying the authenticated user (e.g., an address on the RAM 40 in which the information corresponding to the user is registered) is stored into the user specification memory 44 of the RAM 40. Here, at the point of time of determination of the consistency of the characteristic points (at the point of time of success in the user authentication), time counting starts for the timeout duration to be referred to in the determination processing at S218 described later.

Then, at S213, with reference to the present setting condition (information corresponding to the user stored in the user specification memory 44, among the information stored in the user information storing table 43 (FIG. 2)), it is determined whether the fingerprint transmitting function is permitted.

Then, at S213, when it is determined that the fingerprint transmitting function is permitted, the procedure shifts to S214. Then, the fingerprint collation data, the user ID, and the password stored in the user information storing table 43 while being corresponding to the authenticated user are transmitted to the personal computer 70. As such, as described later, the personal computer 70 shifts from a logoff state into a logon state.

Then, at S215, a message that the personal computer 70 starts up is displayed on the display unit 52. Then, the procedure shifts to S216.

On the other hand, at S213, when it is determined that the fingerprint transmitting function is not permitted, the procedure directly shifts to S216.

At S216, it is determined whether function execution operation for performing a desired function among the FAX function, the copy function, the digital camera print function, the PC scanner function, the PC-FAX function, and the PC print function has been performed in the operation unit 60. Specifically, when any one of the FAX mode key 62, the copy mode key 63, the digital camera print mode key 64, the PC scanner mode key 65, the PCFAX mode key 66, and the PC print mode key 67 is pressed, it is determined that function execution operation are performed.

Then, at S216, when it is determined that function execution operation (pressing of mode keys 62 to 67) is not performed, the procedure shifts to S217. Then, it is determined whether predetermined logout operation for returning into a standby state has been performed in the operation unit 60.

Then, at S217, when it is determined that logout operation has been performed, the setting that is for the user whose fingerprint has been collated and that has been set up at S212 is released. Then, the procedure returns to S201.

On the other hand, at S217, when it is determined that logout operation is not performed, the procedure shifts to S218. Then, it is determined whether the timeout duration the time counting of which has been started at the time of user authentication (S210: YES) has reached a predetermined time (e.g., 10 minutes).

Then, at S218, when it is determined that the timeout duration has reached a predetermined time, the procedure returns to S201. That is, even when user authentication is successful as a result of the input of a fingerprint, if function execution operation is not effectively performed within the predetermined time, the state returns to a standby state (a state that a fingerprint need be inputted).

On the other hand, at S218, when it is determined that the timeout duration does not reach a predetermined time, the procedure shifts to S219. Then, similarly to S203 described above, it is determined whether logoff operation for causing the personal computer 70 to be logged off has been performed in the operation unit 60.

Then, at S219, when it is determined that logoff operation has been performed, the procedure shifts to S220. Then, similarly to S204 described above, a logoff instruction for logging off the personal computer 70 is transmitted to the personal computer 70. After that, the procedure returns to S216. As such, as described later, the personal computer 70 shifts from a logon state into a logoff state.

On the other hand, at S219, when it is determined that logoff operation is not performed, the procedure directly returns to S216.

On the other hand, at S216, when it is determined that function execution operation (pressing of mode keys 62 to 67) has been performed, the procedure shifts to S221. Then, it is determined whether the function corresponding to the pressed mode keys 62 to 67 is permitted. Specifically, the determination is performed on the basis of the information stored in the user information storing table 43 while being corresponding to the authenticated user.

Then, at S221, when it is determined that the function corresponding to the pressed mode keys 62 to 67 is not permitted, the procedure shifts to S222. Then, a message indicating an error is displayed on the display unit 52. After that, the procedure returns to S216.

On the other hand, at S221, when it is determined that the function corresponding to the pressed mode keys 62 to 67 is permitted, the procedure shifts to S223. Then, the function corresponding to the pressed mode keys 62 to 67 is executed. After that, the procedure returns to S201.

Figure 5:
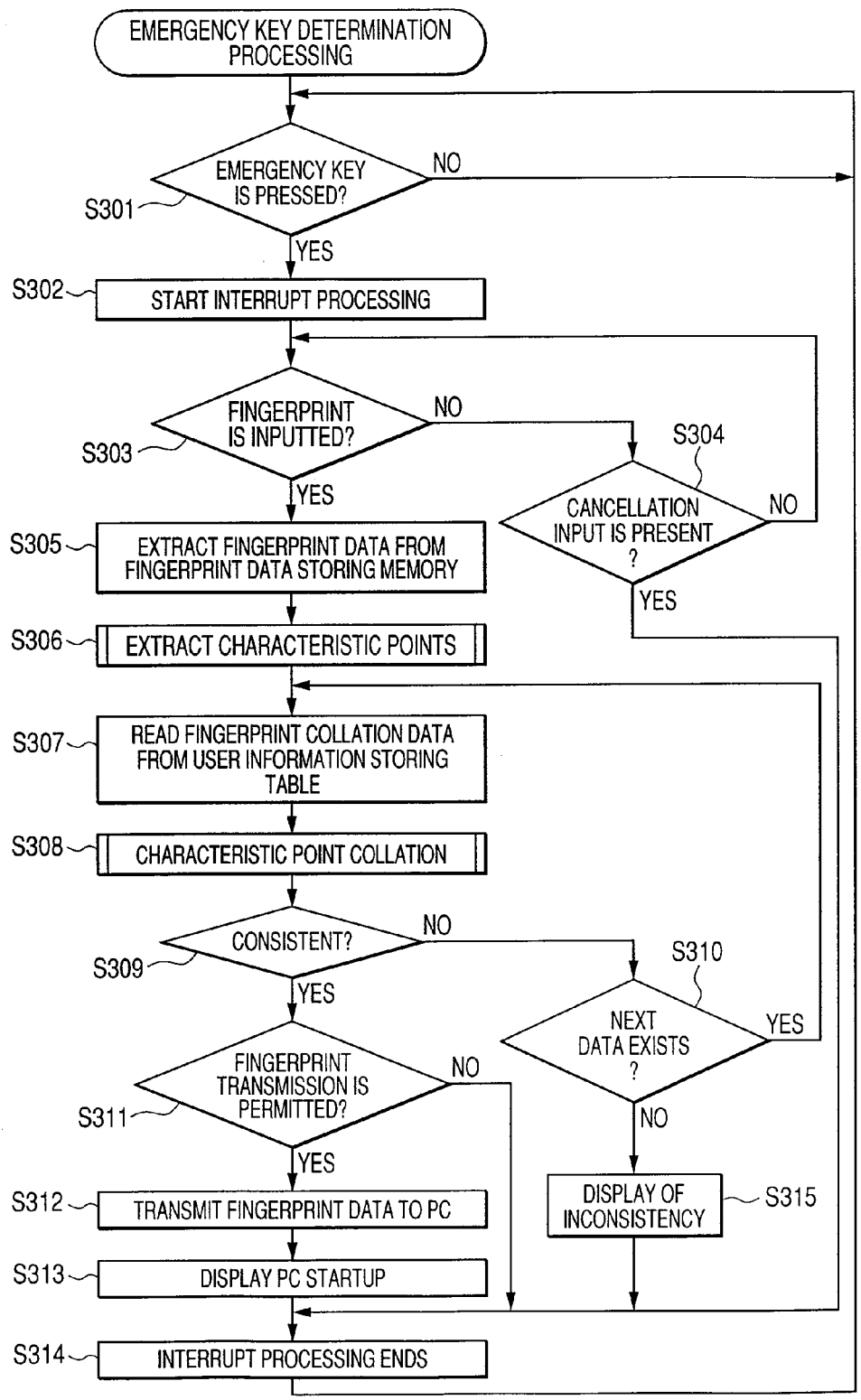
FIG. 5 is a flowchart of emergency key determination processing performed by a multifunction apparatus of a first aspect.

Next, emergency key determination processing performed by the CPU 20 of the multifunction apparatus 10 is described with reference to the flowchart of FIG. 5. Here, the emergency key determination processing starts when the procedure shifts to an operation mode of performing the FAX function, the copy function, the digital camera print function, the PC scanner function, the PC-FAX function, or the PC print function.

When the emergency key determination processing starts, first, at S301, it is determined whether the emergency key 68 of the operation unit 60 has been pressed. When it is determined that the emergency key 68 has been pressed, the procedure shifts to S302.

At S302, in a state that the processing of the operation mode currently under execution is continued, various kinds of information input (such as input from the operation unit 60 and input from the fingerprint reading unit 51) are accepted by an interrupt processing or an information processing is performed. For example, in the operation mode for performing the copy function, when read processing or print processing has been started as processing for the copy function, the above-described interrupt processing is performed in a state that these processing are performed. Further, at that time, the display unit 52 temporarily deletes or reduces in size a display concerning the currently executed operation mode, and displays to indicate that the emergency key 68 has been operated and that a fingerprint input is to be accepted.

Then, at S303, similarly to S205 described above, a fingerprint is read by the fingerprint reading unit 51, so that it is determined whether a fingerprint has been inputted.

Then, at S303, when it is determined that a fingerprint is not inputted, the procedure shifts to S304. Then, it is determined whether predetermined cancellation operation for canceling the state of waiting for fingerprint input and restarting the processing of the operation mode has been performed in the operation unit 60.

Then, at S304, when it is determined that the cancellation operation is not performed, the procedure returns to S303.

On the other hand, at S304, when it is determined that cancellation operation has been performed, the procedure shifts to S314.

On the other hand, at S303, when it is determined that a fingerprint has been inputted, the procedure shifts to S305. Then, similarly to S206 described above, processing is performed for reading the fingerprint data (fingerprint data that represents the fingerprint read by the fingerprint reading unit 51) stored in the fingerprint data storing memory 41.

Then, at S306, similarly to S207 described above, in accordance with the fingerprint characteristics extraction algorithm 31 stored in the ROM 30, characteristic point extraction processing is performed for extracting characteristic points from the fingerprint represented by the fingerprint data read at S305.

Then, at S3307, similarly to S208 described above, processing is performed for reading the fingerprint collation data (one of the plurality of finger print collation data, when fingerprint collation data is stored for a plurality of users) from the user information storing table 43.

Then, at S308, similarly to S209 described above, in accordance with the characteristic point collation algorithm 32 stored in the ROM 30, a characteristic point collation processing is performed for collating the characteristic points of the fingerprint extracted at S306 with the fingerprint collation data read at S307.

Then, at S309, similarly to S210 described above, it is determined whether the characteristic points are consistent with each other the characteristic point collation processing at S308.

Then, at S309, when it is determined that the characteristic points are not consistent with each other, the procedure shifts to S310. Then, similarly to S211 described above, it is determined whether the next data (not-yet-collated data) is present in the user information storing table 43.

Then, at S310, when it is determined that the next data exists, the procedure returns to S307. Then, the above-described processing is performed.

On the other hand, at S310, when it is determined that the next data does not exist (that is, when the user authentication is unsuccessful), the procedure shifts to S315. Then, a message that the user authentication is unsuccessful is displayed on the display unit 52. Then, the procedure shifts to S314. Here, a buzzer sound may be outputted together with the message.

On the other hand, at S309, when it is determined that the characteristic points are consistent with each other (that is, when the user authentication has been successful), the procedure shifts to S311. Then, similarly to S213 described above, with reference to the current setting condition (information corresponding to the user stored in the user specification memory 44, among the information stored in the user information storing table 43 (FIG. 2)), it is determined whether the fingerprint transmitting function is permitted.

Then, at S311, when it is determined that the fingerprint transmitting function is permitted, the procedure shifts to S312. Then, similarly to S214 described above, the fingerprint collation data, the user ID, and the password stored in the user information storing table 43 while being corresponding to the authenticated user are transmitted to the personal computer 70. As such, as described later, the personal computer 70 shifts from a logoff state into a logon state.

Then, at S313, similarly to S215 described above, a message that the personal computer 70 has been started up is displayed on the display unit 52. Then, the procedure shifts to S314.

At S314, the interrupt processing started at S302 is terminated so that the processing of the operation mode is normally performed. Further, the display concerning the operation mode under execution which has been deleted or reduced in size is restored. Then, the procedure returns to S301.

As such, the personal computer 70 is capable of shifting from a logoff state into a logon state at a timing desired by the user during the operation mode. Thus, for example, in a case that setting is so that when the personal computer 70 having once shifted into a logon state in the previous processing of S214 is not operated for a predetermined time, it should shift to a state (corresponding to a logoff state) that a screen saver is automatically started up and that the operation is not permitted, the personal computer 70 can shift to a usable state (logon state) again when the above-described emergency key 68 is pressed.

Here, the above-described description has been given for the case that when the emergency key 68 is pressed, in a state that the operation mode is continued, the processing such as the reading of a fingerprint, the collation, and the transmission of fingerprint collation data to the personal computer 70 is performed in parallel. However, depending on the state of the operation mode, the operation mode itself may be temporarily stopped, so that processing for the emergency key 68 may be independently performed.

Figure 6:
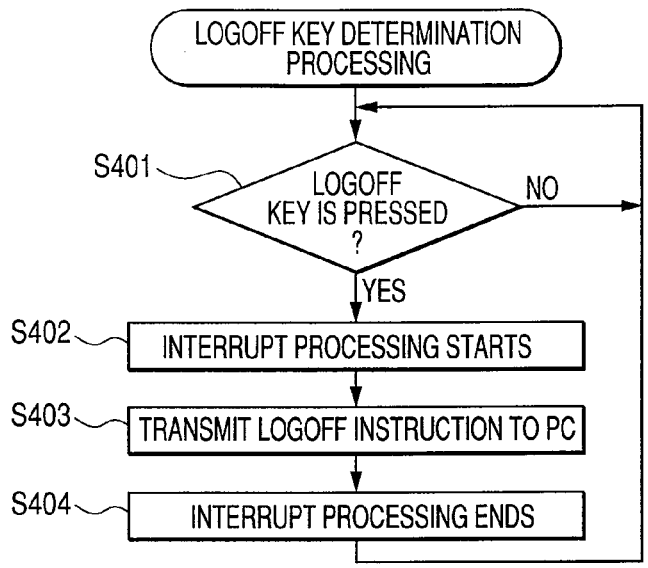
FIG. 6 is a flowchart of logoff key determination processing performed by a multifunction apparatus of a first aspect.

Next, a logoff key determination processing performed by the CPU 20 of the multifunction apparatus 10 is described with reference to the flowchart of FIG. 6. Here, similarly to the emergency key determination processing (FIG. 5) described above, the logoff key determination processing starts when the procedure shifts to an operation mode of performing the FAX function, the copy function, the digital camera print function, the PC scanner function, the PC-FAX function, or the PC print function.

When the logoff key determination processing starts, first, at S401, it is determined whether the logoff key 69 of the operation unit 60 has been pressed. When it is determined as having been pressed, the procedure shifts to S402.

At 3402, similarly to S302, in a state that the processing of the operation mode currently under execution is continued, various kinds of information input are accepted by interrupt processing or information processing is performed. Further, at that time, the display unit 52 may temporarily delete or reduce in size the display concerning the currently executed operation mode, and may display to indicate that the logoff key 69 has been operated.

Then, at S403, similarly to S204 described above, a logoff instruction for causing the personal computer 70 to be logged off is transmitted to the personal computer 70.

Then, at S404, similarly to S314 described above, the interrupt processing started at S402 is terminated so that the processing of the operation mode is normally performed. Then, the procedure returns to S401.

As such, the personal computer 70 is capable of shifting from a logon state into a logoff state at a timing desired by the user during the operation mode. Thus, for example, when it is determined that the personal computer 70 having once shifted into a logon state in the previous processing of S214 is not actually used by the user, the personal computer 70 is capable of shifting to a logoff state immediately when the above-described logoff key 69 is pressed. This avoids the situation that the personal computer 70 is left alone in a logon state for a predetermined time so that the personal computer 70 is operated by a user to whom use is not permitted.

Figure 7:
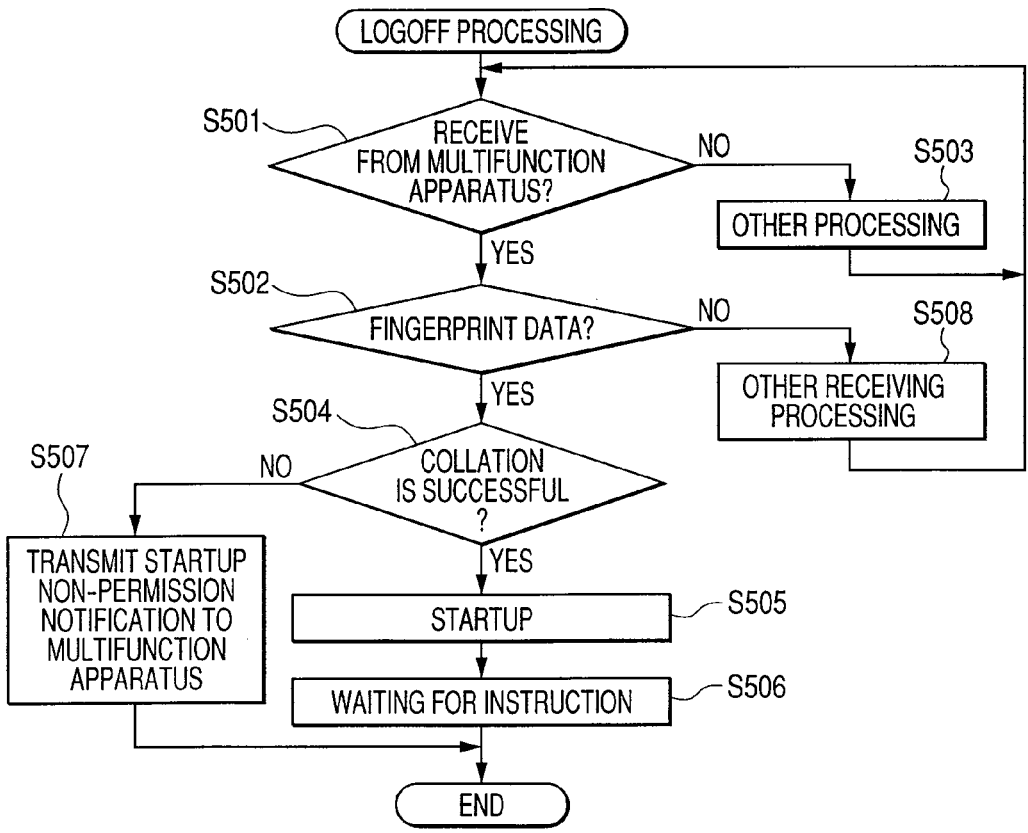
FIG. 7 is a flowchart of logoff processing performed by a personal computer of a first aspect.

Next, a logoff processing performed by the CPU 71 of the personal computer 70 is described with reference to the flowchart of FIG. 7. The logoff processing starts when the personal computer 70 shifts to a logoff state.

When the logoff processing starts, first, at S501, it is determined whether any data is received from the multifunction apparatus 10.

Then, at S501, when it is determined that data has been received, the procedure shifts to S502. Then, it is determined whether the received data includes a fingerprint collation data.

Then, at S502, when it is determined that a fingerprint collation data is included, the procedure shifts to S504.

On the other hand, at S501, when it is determined that data is not received, the procedure shifts to S503. Then, other processing (ordinary processing not particularly relevant to the present aspect of the invention) is performed. After that, the procedure returns to S501. Further, at S502, when it is determined that the received data does not include fingerprint collation data, the procedure shifts to S508. Then, other receiving processing is performed. Then, similarly, the procedure returns to S501.

At S504, it is determined whether the user collation has been successful (whether the user is an authorized user) on the basis of the fingerprint collation data, the user ID, and the password received from the multifunction apparatus 10. Specifically, the collation is performed with the information of the user IDs, the passwords, and the fingerprints of the users to whom use is permitted, which is stored (registered) in advance in the storage unit 80 of the personal computer 70.

As such, the information of the fingerprint inputted and collated in the multifunction apparatus 10 is transmitted to the personal computer 70. Then, collation is performed again on the personal computer 70 side. Thus, double management is performed for the users to whom use of the personal computer 70 is permitted. This improves the system security.

Then, at S504, when it is determined that the user collation has been successful, the procedure shifts to S505. Then, processing is performed for causing the personal computer 70 to shift from a logoff state into a logon state.

Then, at S506, the procedure shifts to a state waiting for an instruction (an operation waiting state). After that, the present logoff processing ends.

On the other hand, at S504, when it is determined that the user collation is unsuccessful, the procedure shifts to S507. Then, a startup non-permission notification indicating that startup is not permitted is transmitted to the multifunction apparatus 10. Then, the present logoff processing ends.

Figure 8:
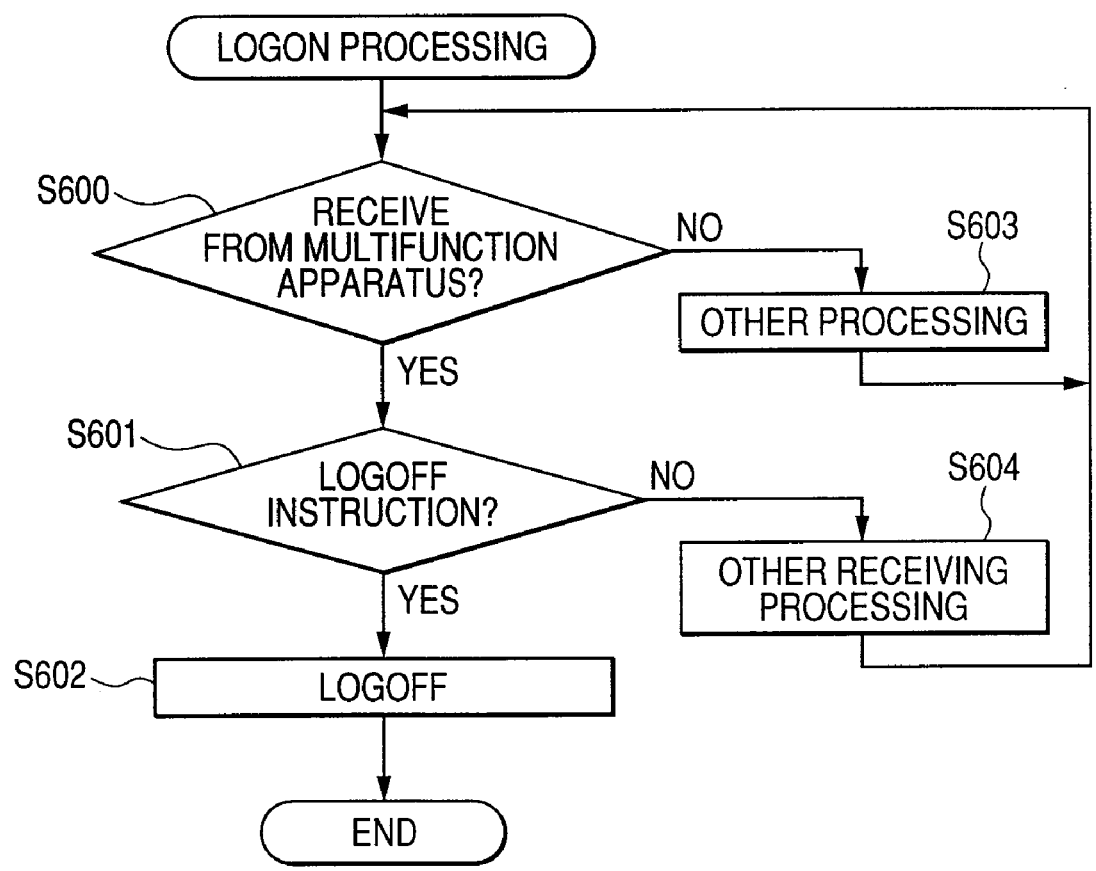
FIG. 8 is a flowchart of logon processing performed by a personal computer of a first aspect.

Next, logon processing performed by the CPU 71 of the personal computer 70 is described with reference to the flowchart of FIG. 8. The logon processing starts when the personal computer 70 shifts to a logon state.

When the logon processing starts, first, at S600, it is determined whether any data is received from the multifunction apparatus 10. Then, at S600, when it is determined that data has been received, the procedure shifts to S601. Then, it is determined whether the received data is a logoff instruction.

Then, at S601, when it is determined as being a logoff instruction, the procedure shifts to S602. Then, at S602, processing is performed for causing the personal computer 70 to shift from a logon state into a logoff state. Then, the present logon processing ends.

On the other hand, at S600, when it is determined that data is not received, the procedure shifts to S603. Then, other processing (ordinary processing not particularly relevant to the present aspect of the invention) is performed. After that, the procedure returns to S600. Further, at S601, when it is determined that the received data is not a logoff instruction, the procedure shifts to S604. Then, other receiving processing is performed. Then, similarly, the procedure returns to S600.

As described above, in the communication system of the first aspect, the multifunction apparatus 10 identifies a user from the inputted fingerprint (S205 to S212) and performs processing in accordance with a setting condition corresponding to the user (S213, S221, S311). Further, processing is performed for transmitting the inputted fingerprint to the personal computer 70 (S214, S312). Thus, according to the multifunction apparatus 10 of the present aspect, the inputted fingerprint of a user can be utilized not only in the multifunction apparatus 10 but also in the personal computer 70. As a result, the configuration for inputting the fingerprint is capable of being shared between the multifunction apparatus 10 and the personal computer 70. Further, even in the personal computer 70 not having a fingerprint input device, user management using the information of the fingerprint is capable of being performed.

Further, in the multifunction apparatus 10 of the present aspect, even during the operation mode for performing each function such as the copy function, when the emergency key 68 is pressed, the fingerprint is transmitted to the personal computer 70, and the personal computer 70 is logged on (S301 to S314). Thus, the communication system of the present aspect has a configuration without a dedicated fingerprint input device in the personal computer 70, but still allows a user to log onto the personal computer 70 at a desired timing. In particular, according to the multifunction apparatus 10 of the present aspect, whether the transmission of the fingerprint to the personal computer 70 should be permitted can be set up for each user (FIG. 2). Thus, such management can be performed that a group of the users are restricted from logging onto the personal computer 70.

Further, in the multifunction apparatus 10 of the present aspect, when setting is performed so that the fingerprint transmitting function is not permitted, such setting cannot be performed that a function to be performed in cooperation with the personal computer 70 should be permitted (S108, S109). This avoids a setting having a contradiction. That is, a function to be performed in cooperation with the personal computer 70 is permitted regardless that the logon to the personal computer 70 is not permitted.

On the other hand, the multifunction apparatus 10 of the present aspect informs the user that the fingerprint has been transmitted to the personal computer 70 (S215, S313). Thus, the user can recognize that the personal computer 70 has been logged on.

In addition, according to the multifunction apparatus 10 of the present aspect, when the logoff key 69 is pressed, a logoff instruction is transmitted to the personal computer 70 so that the personal computer 70 is logged off (S203, S204, S219, S220, and S401 to S404). Thus, according to the communication system of the present aspect, the user can log off the personal computer 70 at a desired timing.

Here, in the communication system of the first aspect, the multifunction apparatus 10 serves as an information processing apparatus. The biometric data input unit (first input unit) allows a user to input a biometric data (e.g., a fingerprint, an iris, a voiceprint, a retina, and a vein) of the user. The user information storing table 43 of the RAM 40 serves as a biometric data storage unit (storage). The biometric data storage unit stores settings to be set up as a setting condition, while corresponding to the biometric data (need not be stored in advance; a configuration capable of storing this is sufficient).

Further, the standard key group 61 of the operation unit 60 serves as a registration instruction input unit (second input unit). The mode keys 62 to 67 of the operation unit 60 serves as the selection instruction input unit (second input unit). The emergency key 68 of the operation unit 60 serves as a transmission instruction input unit (second input unit). The logoff key 69 of the operation unit 60 serves as the standby instruction input unit (second input unit).

Further, the fingerprint reading unit 51 serves as the biometric data input unit (first input unit). The CPU 20 that performs the processing of S108 and S109 in the fingerprint registration processing (FIG. 3) serves as an invalidity informing unit (informing unit). The CPU 20 that performs the processing of S110 corresponds to the storage processing unit (storing controller).

Further, the CPU 20 that performs the processing of S206 to S212 in the fingerprint transmission processing (FIG. 4) serves as a condition setting unit (setting unit).

Further, the CPU 20 that performs the processing of S213 and the processing of S311 in the emergency key determination processing (FIG. 5) serves as the transmission prohibiting unit (prohibiting unit). The CPU 20 that performs the processing of S214 and the processing of S312 serves as the biometric data transmission unit (transmission unit). The CPU 20 that performs the processing of S215 and the processing of S313 serves as the transmission informing unit (informing unit).

Further, the CPU 20 that performs the processing of S204 and S220 and the processing of S403 in the logoff key determination processing (FIG. 6) serves as to the standby instruction transmission unit (standby transmission unit). The personal computer 70 serves as an external device.

Second Aspect

Next, a communication system of a second aspect is described.

Figure 9:
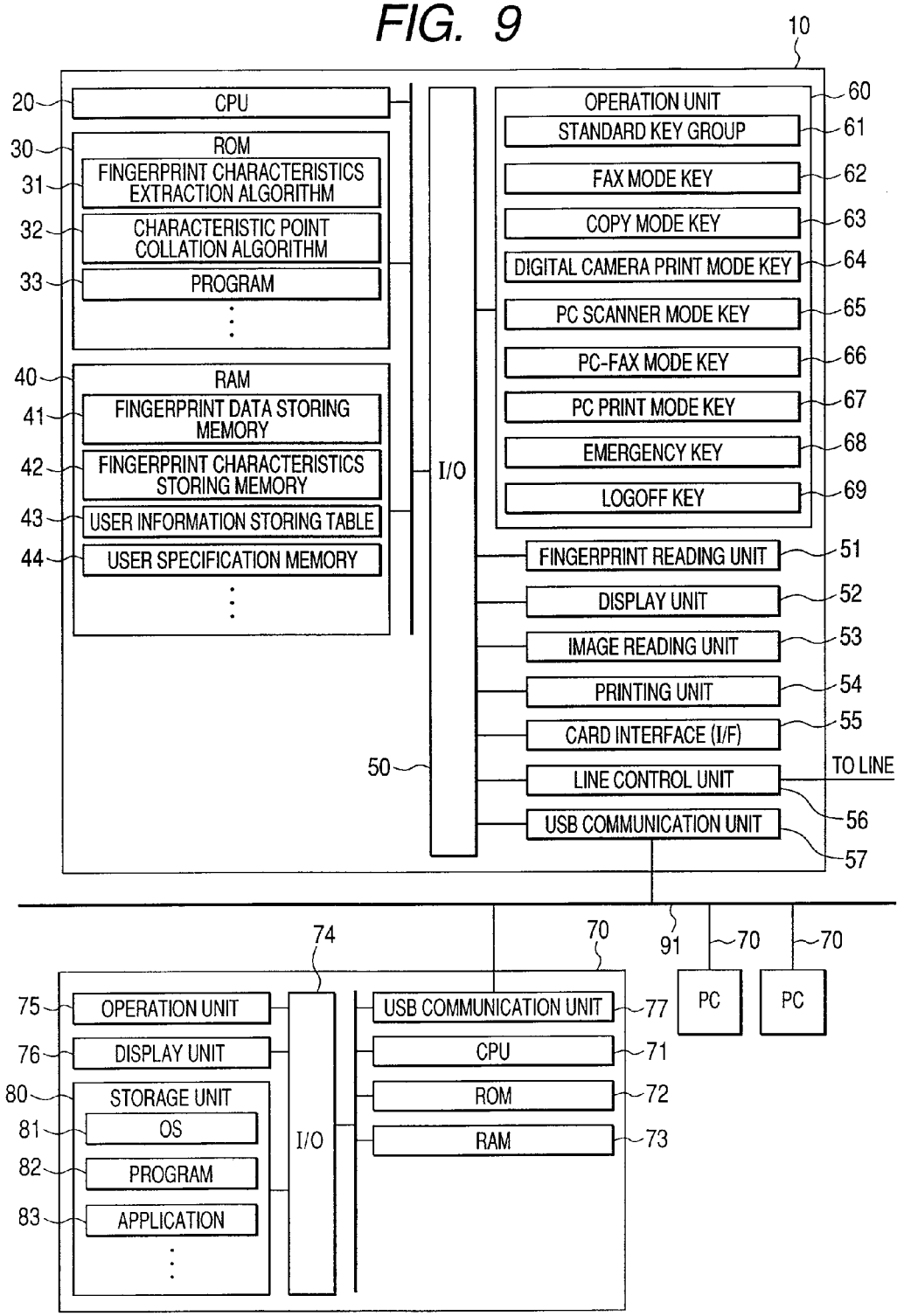
FIG. 9 is a block diagram showing a schematic configuration of a communication system of a second aspect.

FIG. 9 is a block diagram showing a schematic configuration of a communication system of a second aspect.

As shown in the figure, the communication system of the second aspect is different from the communication system of the first aspect in that the multifunction apparatus 10 is configured so as to perform communication to a plurality of personal computers 70, 70, . . . via a Local Area Network (LAN) 91. That is, on the other hand to the communication system of the first aspect which the multifunction apparatus 10 and the personal computer 70 is configured so as to perform communication in one-to-one correspondence, the communication system of the second aspect is configured so that the multifunction apparatus 10 is capable of performing communication with a plurality of the personal computers 70, 70, . . . . In other words, in the communication system of the first aspect, an exemplary configuration has been assumed for the case that a plurality of users use one personal computer 70. On the other hand, in the communication system of the second aspect, an exemplary configuration is assumed for the case that a plurality of users use individual personal computers 70. Here, the communication system of the second aspect has a similar basic configuration as the communication system of the first aspect. Thus, the common parts are designated by the same reference numerals, so that detailed description is omitted. The following description is given with attention focused on the differences.

In the communication system of the second aspect, the multifunction apparatus 10 is different from the first aspect in that it does not have a setting condition of whether the fingerprint transmitting function should be permitted. That is, in comparison with the user information storing table 43 (FIG. 2) of the first aspect, as shown in FIG. 10, the user information storing table 43 of the second aspect does not have a storage area for the permission/non-permission of fingerprint transmission. On the other hand, the user information storing table 43 of the second aspect can register the identification name (PC name) and the IP address of the personal computer 70 owned by each user. Specifically, at S106 of the fingerprint registration processing (FIG. 3), the PC name and the IP address are inputted in addition to the user ID and the password.

Figure 11:
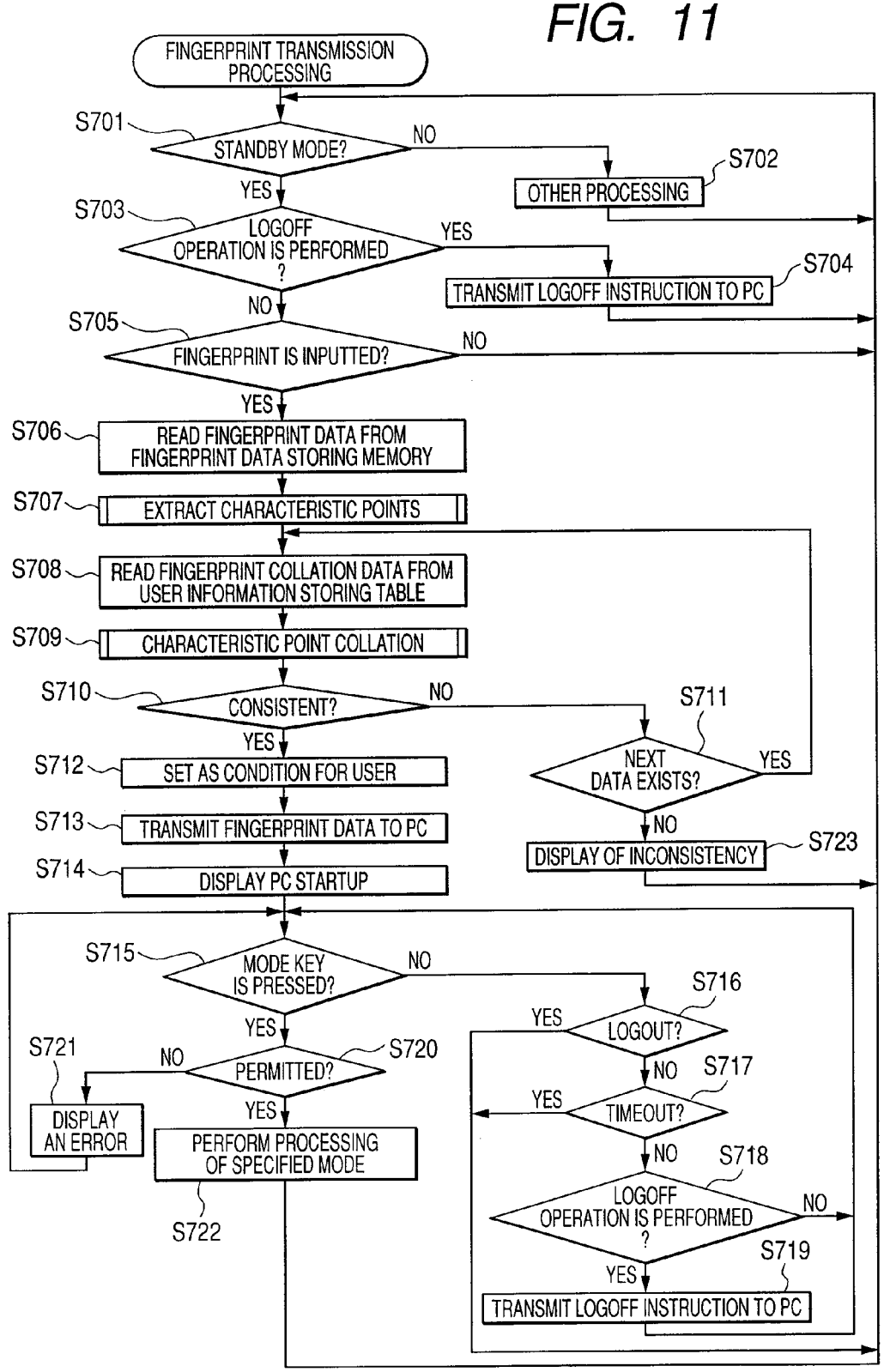
FIG. 11 is a flowchart of fingerprint transmission processing performed by a multifunction apparatus of a second aspect.

Next, the fingerprint transmission processing performed by the CPU 20 of the multifunction apparatus 10 of the second aspect in place of the fingerprint transmission processing (FIG. 4) described in the first aspect is described with reference to the flowchart of FIG. 11. Here, each processing of S701 to S723 in a fingerprint transmission processing according to the second aspect is similar to each processing of S201 to S212 and S214 to S224 in the fingerprint transmission processing of the first aspect. Thus, description is omitted with regard to the contents of these processing steps.

In the fingerprint transmission processing of the second aspect, at S712, information corresponding to the authenticated user is set up as the setting condition of the multifunction apparatus 10. After that, without performing the determination processing whether the fingerprint transmitting function is permitted (S213), the procedure directly shifts to S713. Then, at S713, the fingerprint collation data, etc., stored in the user information storing table 43 is transmitted to a personal computer 70 corresponding to the authenticated user.

As described above, the communication system of the second aspect also achieves a similar effect as the communication system of the first aspect. In particular, in association with the startup (setting of the operating environment) of the information processing apparatus performed by the input of a fingerprint, the personal computer 70 used by a user who has inputted the fingerprint can be logged on. For example, when operation of the personal computer is desired after the operation of the information processing apparatus, the personal computer 70 has already shifted into a logon state without the necessity of separate operation of logging onto the personal computer 70. This permits immediate start of the operation.
Third Aspect Next, a communication system of a third aspect is described.

The communication system of the third aspect has a similar basic configuration as the communication system of the second aspect. However, a difference exists in that the personal computer 70 is logged on only when a function to be performed in cooperation with the personal computer 70 is selected. Specifically, the CPU 20 of the multifunction apparatus 10 performs a fingerprint transmission processing shown in the flowchart of FIG. 12, in place of the fingerprint transmission processing (FIG. 11) described in the second aspect.

Here, the fingerprint transmission processing performed by the CPU 20 of the multifunction apparatus 10 of the third aspect is described below with reference to the flowchart of FIG. 12. Here, each processing of S801 to S819 and S821 to S824 in the present fingerprint transmission processing is similar to each processing of S701 to S712, S715 to S721, S713, S714, S722, and S723 in the fingerprint transmission processing of the second aspect. Thus, description is omitted with regard to the contents of these processing steps.

In the fingerprint transmission processing of the third aspect, at S812, information corresponding to the authenticated user is set up as the setting condition of the multifunction apparatus 10. After that, without performing the transmission processing for the fingerprint collation data, etc., (S713) and the display processing for the message (S714), the procedure directly shifts to S813. Then, at S813, it is determined whether function execution operation has been performed in the operation unit 60.

Further, in the fingerprint transmission processing of the third aspect, at S818, when it is determined that the function corresponding to pressed mode keys 62 to 67 is permitted, the procedure shifts to S820. Then, it is determined whether the function corresponding to the pressed mode keys 62 to 67 is a function to be performed in cooperation with the personal computer 70 (the PC scanner function, the PC-FAX function, or the PC print function).

Then, at S820, when it is determined as being a function to be performed in cooperation with the personal computer 70, the procedure shifts to S821. Then, the fingerprint collation data, the user ID, and the password stored in the user information storing table 43 in a manner corresponding to the authenticated user are transmitted to the personal computer 70.

Then, at S822, a message that the personal computer 70 has been started up is displayed on the display unit 52. Then, the procedure shifts to S823.

On the other hand, at S820, when it is determined as not being a function to be performed in cooperation with the personal computer 70, the procedure directly shifts to S823.

As described above, the communication system of the third aspect also achieves a similar effect to the communication system of the first aspect. In particular, in the communication system of the third aspect, only when a function to be performed in cooperation with the personal computer 70 is selected, the multifunction apparatus 10 transmits the fingerprint to, and logs on the personal computer 70 (S820, S821). This avoids the situation that the personal computer 70 is automatically logged on regardless that a function that can be performed by the multifunction apparatus 10 alone is selected and hence the personal computer 70 need not be logged on.
Fourth Aspect Next, a communication system of a fourth aspect is described.

The communication system of the fourth aspect has a similar basic configuration to the communication system of the third aspect. However, there exists a difference in that when the multifunction apparatus 10 performs a function to be performed in cooperation with the personal computer 70, an application 83 to be used in the personal computer 70 can be specified.

Specifically, as shown in FIG. 13, for each of the PC scanner function, the PC-FAX function, and the PC print function, the identification name of an application 83 to be used in the personal computer 70 can be registered in the user information storing table 43. This information is inputted together with the user ID, etc., at S106 of the fingerprint registration processing (FIG. 3).

Then, at S821 of the fingerprint transmission processing (FIG. 12), the identification name of the application 83 is transmitted to the personal computer 70 together with the fingerprint collation data, etc. Further, the CPU 71 of the personal computer 70 performs the logoff processing shown in the flowchart of FIG. 14 in place of the logoff processing (FIG. 7) described in the first aspect. Here, each processing of S901 to S905 and S908 to S910 in this logoff processing is similar to each processing of S501 to S508 in the logoff processing of the first aspect. Thus, description is omitted with regard to the contents of these processing steps.

In the logoff processing of the fourth aspect, at S905, processing is performed for causing the personal computer 70 to shift from a logoff state into a logon state. After that, the procedure shifts to S906.

At S906, it is determined whether the data received from the multifunction apparatus 10 includes the identification name of an application 83.

Then, at S906, when it is determined that the identification name of an application 83 is included, the procedure shifts to S907. Then, an application 83 corresponding to the identification name is started up. After that, the procedure shifts to S908.

On the other hand, at S906, when it is determined that the identification name of an application 83 is not included, the procedure directly shifts to S908.

The communication system of the fourth aspect described above also achieves a similar effect to the communication system of the first aspect. In particular, in the communication system of the fourth aspect, an application 83 desired by the user can automatically be started up and used in the personal computer 70.

An aspect of the present invention has been given above. However, it is obvious that the present invention may be applied in various forms.

For example, in the communication system of each aspect described above, when the emergency key 68 is pressed in the multifunction apparatus 10, a fingerprint is inputted again and the inputted fingerprint is transmitted to the personal computer 70. Alternatively, an already inputted fingerprint may be transmitted.

Further, in the fingerprint transmission processing (FIG. 4, etc.), when mode keys 62 to 67 are pressed within a predetermined time after a successful user authentication based on the inputted fingerprint, the function corresponding to the mode keys 62 to 67 is performed. Alternatively, a fingerprint may be transmitted within the predetermined time. For example, in the course between the NO determination at S218 of the fingerprint transmission processing of FIG. 4 and the transition into S219, similarly to S205, it may be determined whether a fingerprint has been inputted. Then, when it is determined that a fingerprint has been inputted, processing similar to S206 to S215 is performed. By virtue of this, a fingerprint can be transmitted to the personal computer 70 even in waiting of a predetermined time.

Further, the communication system of each aspect described above has been described for an exemplary case that the setting condition is condition whether each function included in the multifunction apparatus 10 should be permitted to the user. However, the present invention is not limited thereto. For example, a parameter used in each function (e.g., reading resolution in the PC scanner function and an address book in the FAX function) may be set up depending on the user.

On the other hand, the communication system of each aspect described above has been described for an exemplary case that when the personal computer 70 is to be logged on, a fingerprint is necessarily transmitted. However, the present invention is not limited thereto. For example, only the data of a fingerprint may be transmitted, or alternatively a startup signal without the data of a fingerprint may be transmitted, so that the personal computer 70 may be logged on. Further, in a configuration that collation of the fingerprint is performed only on the multifunction apparatus 10 side while collation of the fingerprint is not performed on the personal computer 70 side, the user ID and the password may solely be transmitted, so that on the basis of these, it may be determined whether logon should be performed. In this case, logon may be ordinarily performed with input of a user ID and a password by means of key operation on the personal computer 70 side.

In addition, the communication system of each aspect described above has been described for an exemplary case that a fingerprint is employed as the biometric data used for biometric authentication. Alternatively, another biometric data (an iris, a voiceprint, a retina, a vein, etc.) may be employed.

In addition, the communication system of each aspect described above has been described for exemplary case that operation to key group is employed for inputting. Alternatively, another input technique such as touch panel operation, voice input may be employed.

What is claimed is:

1. An information processing apparatus comprising:
    a first input unit that allows a user to input biometric data;
    a storage that stores setting data corresponding to the biometric data;
    a processing unit; and
    memory storing executable instructions that, when executed by the processing unit, cause the processing unit to function as
        a setting unit that sets the setting data corresponding to the biometric data, as a setting of conditions for performing processing, when the biometric data is inputted;
        a unit that performs the processing in accordance with the setting of conditions, wherein the processing includes a cooperation processing and a non-cooperation processing, the cooperation processing being performed in cooperation with the external device and the non-cooperation processing being performed independently from the external device; and
        a transmission unit that transmits the biometric data to an external device.

2. The information processing apparatus according to claim 1, further comprising a second input unit that allows a user to input a transmission instruction,
    wherein when the transmission instruction is input to the second input unit, the transmission unit transmits the biometric data to the external device.

3. The information processing apparatus according to claim 1, further comprising a second input unit that allows a user to input a cooperation instruction and a non-cooperation instruction,
    wherein when the cooperation instruction is input to the second input unit, the unit performs the cooperation processing and the transmission unit transmits the biometric data to the external device,
    wherein when the non-cooperation instruction is input to the second input unit, the unit performs the non-cooperation processing.

4. The information processing apparatus according to claim 1, wherein the cooperation processing comprises at least one of reading image data of an original and transmitting the image data to the external device, receiving image data transmitted from the external device and printing the image data, receiving image data transmitted from the external device and transmitting the image data through a communication line, and receiving image data through a communication line and transmitting the image data to the external device.

5. The information processing apparatus according to claim 1,
    wherein the cooperation processing comprises a plurality of cooperation processings, and
    wherein the setting data comprises:
        a first setting indicating whether or not the transmitting of the biometric data is prohibited, and
        a second setting indicating whether or not performing each of the plurality of cooperation processings is prohibited.

6. The information processing apparatus according to claim 5, further comprising:
    a second input unit that allows a user to input a setting data including the first setting and the second setting;
    wherein the memory further stores executable instructions that, when executed by the processing unit, cause the processing unit to function as a storing controller that stores the setting data input to the second input unit in the storage.

7. The information processing apparatus according to claim 6, wherein the memory further stores executable instructions that, when executed by the processing unit, cause the processing unit to function as:

an informing unit that informs a user that the setting data input to the second input unit being invalid when the setting data inputted by the second input unit includes a first setting of prohibiting the transmitting of the biometric data and a second setting of prohibiting performing at least one of the plurality of cooperation processings.

8. The information processing apparatus according to claim 1,
wherein the storage stores application data regarding an application to be used in the external device for the cooperation processing when the cooperation processing is performed, the application data corresponding to the biometric data,
wherein the transmission unit transmits the application data with the biometric data when the cooperation instruction is input to the second input unit.

9. The information processing apparatus according to claim 1, wherein the memory further stores executable instructions that, when executed by the processing unit, cause the processing unit to function as an informing unit that informs a user of the transmitting of the biometric data when the transmission unit transmits the biometric data.

10. An information processing apparatus comprising:
a first input unit that allows a user to input biometric data;
a storage that stores setting data corresponding to the biometric data;
a processing unit; and
memory storing executable instructions that, when executed by the processing unit, cause the processing unit to function as
a setting unit that sets the setting data corresponding to the biometric data, as a setting of conditions for performing processing, when the biometric data is inputted;
a unit that performs the processing in accordance with the setting of conditions;
a transmission unit that transmits the biometric data to an external device, wherein the setting of conditions includes a setting indicating whether or not the transmitting of the biometric data by the transmission unit is prohibited,
a prohibiting unit that prohibits the transmission of the biometric data by the transmission unit when the setting of conditions set by the setting unit includes a setting of prohibiting the transmitting of the biometric data.

11. An information processing apparatus comprising:
a first input unit that allows a user to input biometric data;
a second input unit that allows a user to input a standby instruction;
a storage that stores setting data corresponding to the biometric data;
a processing unit; and
memory storing executable instructions that, when executed by the processing unit, cause the processing unit to function as
a setting unit that sets the setting data corresponding to the biometric data, as a setting of conditions for performing processing, when the biometric data is inputted;
a unit that performs the processing in accordance with the setting of conditions;
a transmission unit that transmits the biometric data to an external device; and
a standby transmission unit that transmits the standby instruction input to the second input unit to the external device to cause the external device to change from an active mode to a standby mode when the external device receives the standby instruction.

12. A non-transitory computer readable medium having computer executable instructions stored thereon, which when executed by a computer, causes the computer to perform operations comprising:
setting a setting data corresponding to a biometric data, inputted by a user, as a setting of conditions for performing processing;
performing the processing in accordance with the setting of conditions, wherein the processing includes cooperation processing and non-cooperation processing, the cooperation processing being performed in cooperation with the external device and the non-cooperation processing being performed independently from the external device; and
transmitting the biometric data to an external device.

13. The non-transitory computer readable medium according to claim 12, wherein the biometric data is transmitted to the external device in response to user input of a transmission instruction.

14. A non-transitory computer readable medium having computer executable instructions stored thereon, which when executed by a computer, causes the computer to perform operations comprising:
setting a setting data corresponding to biometric data, inputted by a user, as a setting of conditions for performing processing;
performing the processing in accordance with the setting of conditions, wherein the processing includes cooperation processing and non-cooperation processing, the cooperation processing being performed in cooperation with the external device and the non-cooperation processing being performed independently from the external device; and
transmitting the biometric data to an external device,
wherein the setting of conditions comprises a setting indicating whether or not the transmitting of the biometric data is prohibited,
wherein the operations further comprises prohibiting the transmitting of the biometric data to the external device when the setting of conditions includes a setting of prohibiting the transmitting of the biometric data.

15. An information processing apparatus comprising:
an input device that allows a user to input biometric data;
a storage that stores setting data corresponding to the biometric data;
a processor;
memory storing executable instructions thereon that, when executed by the processor, perform a process comprising:
setting the setting data corresponding to the biometric data stored in the first storage as a setting of conditions for performing processing;
performing the processing in accordance with the setting of conditions, wherein the processing includes cooperation processing and non-cooperation processing, the cooperation processing being performed in cooperation with the external device and the non-cooperation processing being performed independently from the external device; and
transmitting the biometric data to an external device.

* * * * *